US009135761B2

(12) United States Patent
Davis

(10) Patent No.: US 9,135,761 B2
(45) Date of Patent: Sep. 15, 2015

(54) METHOD OF MIGRATING RFID TRANSPONDERS IN SITU

(75) Inventor: Michael L. Davis, Amhert, NY (US)

(73) Assignee: Assa Abloy AB (SE)

( * ) Notice: Subject to any disclaimer, the term of this patent is extended or adjusted under 35 U.S.C. 154(b) by 2788 days.

(21) Appl. No.: 11/562,314

(22) Filed: Nov. 21, 2006

(65) Prior Publication Data

US 2007/0174907 A1 Jul. 26, 2007

Related U.S. Application Data

(60) Provisional application No. 60/738,757, filed on Nov. 21, 2005.

(51) Int. Cl.

| | |
|---|---|
| ***G07C 9/00*** | (2006.01) |
| ***G06Q 20/32*** | (2012.01) |
| ***G06Q 20/34*** | (2012.01) |
| ***G07F 7/10*** | (2006.01) |
| ***H04L 9/08*** | (2006.01) |
| ***H04L 9/32*** | (2006.01) |

(52) U.S. Cl.

CPC .......... *G07C 9/00111* (2013.01); *G06Q 20/327* (2013.01); *G06Q 20/341* (2013.01); *G06Q 20/3574* (2013.01); *G07F 7/1008* (2013.01); *H04L 9/0891* (2013.01); *H04L 9/3226* (2013.01); *H04L 2209/805* (2013.01)

(58) Field of Classification Search

CPC .................................................. G07C 9/00111
USPC ............................................................ 726/6
See application file for complete search history.

(56) References Cited

U.S. PATENT DOCUMENTS

| | | | | |
|---|---|---|---|---|
| 6,360,952 | B1 | 3/2002 | Kimlinger et al. | |
| 7,026,935 | B2 * | 4/2006 | Diorio et al. | 340/572.2 |
| 2006/0206927 | A1 | 9/2006 | Wendling et al. | |

FOREIGN PATENT DOCUMENTS

| | | |
|---|---|---|
| EP | 0385290 | 9/1990 |
| GB | 2416195 | 1/2006 |
| WO | WO 00/75773 | 12/2000 |
| WO | WO 00/77717 | 12/2000 |

OTHER PUBLICATIONS

European Search Report for European Patent Application No. EP 06124447, completed Jul. 31, 2007, 2 pages.
Examiner's Opinion for European Patent Application No. EP 06124447, 3 pages.
Davis, Migration Strategies, Workshop on Storage & processor Card-Based Technologies, Jul. 8, 2003, pp. 1-28.
Barker et al, Card Technology Developments and Gap Analysis Interagency Report, National Institute of Standards and Technology Interagency Report 7056, Mar. 2004, pp. 1-101.

* cited by examiner

*Primary Examiner* — Jacob Lipman
(74) *Attorney, Agent, or Firm* — Sheridan Ross P.C.

(57) ABSTRACT

Methods and apparatus for updating secure access credentials are provided. More specifically, data from one or more RFID credentials can be read and subsequently written to one of the original RFID credentials reducing multiple RFID credentials to a single credential. The RFID transponder on the credential that has new data written thereon does not necessarily need to have the same functionality as the RFID transponder on the other RFID credentials that was read.

19 Claims, 7 Drawing Sheets

METHOD OF MIGRATING RFID TRANSPONDERS IN SITU

CROSS REFERENCE TO RELATED APPLICATIONS

This Application claims the benefit of U.S. Provisional Application No. 60/738,757, filed Nov. 21, 2005, the entire disclosure of which is hereby incorporated herein by reference.

FIELD OF THE INVENTION

The present invention is directed to a method of converting Radio Frequency Identification (RFID) transponders from one manufacturer's format to another. Specifically, the invention provides a method of converting an RFID transponder compatible with one manufacturer's system to be compatible with a different manufacturer's system using the same RFID transponder.

BACKGROUND

In access control systems, credentials or RFID devices are typically used to store data that "uniquely" identifies the device holder or cardholder. To gain access to a resource or asset such as a building, a financial account, information, or a computer, a user presents the credential to a "reader" that reads the data and subsequently transmits the read data to an upstream device such as a panel or a host system. At the upstream device, a decision is typically made to either grant access to the cardholder or not.

RFID transponder technology is a mature, reliable, convenient, cost-effective, and popular technology that is used in access control applications. Because of these desirable features, there is a large installed base of RFID transponders worldwide. RFID transponders can be carried in a variety of different form factors including cards, passports, key fobs, cellular phones, PDA's, and so on. The combination of an RFID transponder and a carrying device is generally referred to herein as an RFID credential.

In the highly competitive commercial environment, trying to convince a user to switch from one manufacturer's system to another may be an economic obstacle if there is a large existing installed base of RFID credentials or other type of transponder carriers. This is because upgrading every credential can be a difficult, time consuming, and costly process. In fact, the most difficult and potentially costly aspect of updating a secure access system lies in updating the credentials of the system. Therefore, it is highly desirable to utilize a system update method that reduces the impact of replacing all of the existing credentials, thus minimizing disruptions.

The idea of using multiple reader/writers to convert a population of RFID credentials from one manufacturer to another using a new credential was presented as a topic at a conference hosted by the National Institute of Standards Technology (NIST), a US Government organization. But these techniques are based upon the approach that the contents of one manufacturer's credential were copied onto another (different) manufacturer's credential. This is required when the two manufacturers use different physical transponder chips with different characteristics on their credentials. For example, the NIST presentation focused on moving from credentials operating at 125 kHz to credentials that operate at 13.56 MHz.

Updating credentials from one card manufacturer's format to another manufacturer's format, for example, represents another relatively significant investment of time and money in the upgrade process because new credentials have to be issued. One reason an institution or business may decide to change from one manufacturer's credential to another manufacturer's credential is that some manufacturers offer additional security features that others do not. Another reason might be that the original manufacturer of the RFID credentials and access control readers may have discontinued the system or even went out of business. Still another reason might be because the institution or business has several RF systems from different vendors each requiring a different credential. The institution or business may want to consolidate to a single manufacturer's format. The investment of money is significant in that a new credential capable of communicating via the new manufacturer's format needs to be purchased to replace every existing credential. The investment in time is significant in that each of the newly purchased credentials needs to be updated into the existing system and associated with the identity of the appropriate device or person. Of course, all of the credentials do not need to be updated at the same time but, but the eventual completion of the migration may still require a substantial amount of time on the part of carriers of the RFID credentials and the entity updating the RFID credentials.

An alternative method of using a multi-technology reader capable of reading both the present credential and the new credential is one approach that can be used. Of course, this is also a costly process because every reader must be replaced if the existing reader cannot read the format of both the old and new credential which is often the case since reader manufacturers often use proprietary formats that may be patented preventing one company from manufacturing a "universal" reader capable of reading the universe of credential formats.

SUMMARY

It is therefore an aspect of the present invention to provide a method of updating data on an RFID credential. Embodiments of the invention are intended to remove or reduce any financial, logistical, or technical obstacles in the process of moving data from one manufacturer's RF communication format to another manufacturer's format using the same RFID credential.

In one embodiment, a method is provided for updating an access control system. The method generally includes the following steps:

(a) reading data from a first RFID credential that utilizes a first set of characteristics to communicate with RFID readers;

(b) changing the data such that at least one characteristic in the first set of characteristics changes, resulting in a second set of characteristics; and (c) writing the changed data with the second set of characteristics back to the first RFID such that the first RFID utilizes the second set of characteristics to communicate with RFID readers.

As used herein "manufacturer" is understood to generally mean the company responsible for formatting the RFID credential to work with its access control system. As such, the manufacturer of the credential can be understood to mean both the maker of the RFID credential and the programmer of the RFID credential. Each entity has a certain amount of control over the format of the data used by the RFID credential as well as the communication protocols employed by the RFID credential.

By writing the changed data back to the same RFID device from which the original data came, a population of RFID's can be updated without a large accumulation of cost. The cost savings originate from the fact that RFID credentials can be updated, even to a different manufacturer's format, without requiring the purchase and subsequent re-issuance of new RFID credentials.

In accordance with alternative embodiments of the present invention, data from multiple credentials can have their characteristics changed to a common set of characteristics and rewritten onto just one of the original credentials. This is particularly true of newer generation smart cards that support multiple applications (i.e., credentials) in a single credential. This particular situation allows for the simultaneous updating of a population of credentials as well as the consolidation of the functionality of multiple credentials into a single credential. The credentials that have their data combined onto a single credential may each be directed toward a different application and the final credential will be enabled with the functionality of all the credentials. The credentials do not necessarily need to employ the same types of communication protocols. For example, some of the credentials that are combined may be RF enabled whereas other credentials may use magnetic, light, or other non-RF enabled machine-readable credential communication modalities.

In one embodiment of the present invention, a reader may be used to read the data from a credential. Thereafter, a different reader/writer may be used to rewrite the collected data back to the same credential. This is desirable when the internal characteristics of the data on the credential are unknown or even protected by patents. The solution, in one embodiment, is to use a reader from the original RFID credential manufacturer to read the data and output the decoded data. The decoded data can then be rewritten in another manufacturer's set of characteristics and supplied back to the same RFID credential. For convenience, both readers can be packaged in a single unit; however, separate units are possible. Furthermore, there may be an array of readers used to read credentials and one or more writers in communication with the array of readers may be used to rewrite the data collected data back to the same credentials. Moreover, each of the readers in the array of readers may actually be a reader made by the manufacturer of that credential.

These embodiments are not meant to be limiting, but rather are only examples of the type of configurations used to accomplish the conversion process.

The Summary is neither intended or should it be construed as being representative of the full extent and scope of the present invention. The present invention is set forth in various levels of detail and the Summary as well as in the attached drawings and in the detailed description of the invention and no limitation as to the scope of the present invention is intended by either the inclusion or non inclusion of elements, components, etc. in the Summary. Additional aspects of the present invention will become more readily apparent from the detailed description, particularly when taken together with the drawings.

DETAILED DESCRIPTION

Embodiments of the present invention are directed toward methods, devices, and systems that are used to update an RFID credential population. Although well suited for use in systems and methods employing RF communication protocols, embodiments of the present invention may be suitable for use in systems employing other communication protocols including, but not limited to, optical communication protocols, magnetic communication protocols, and the like.

Figure 1:
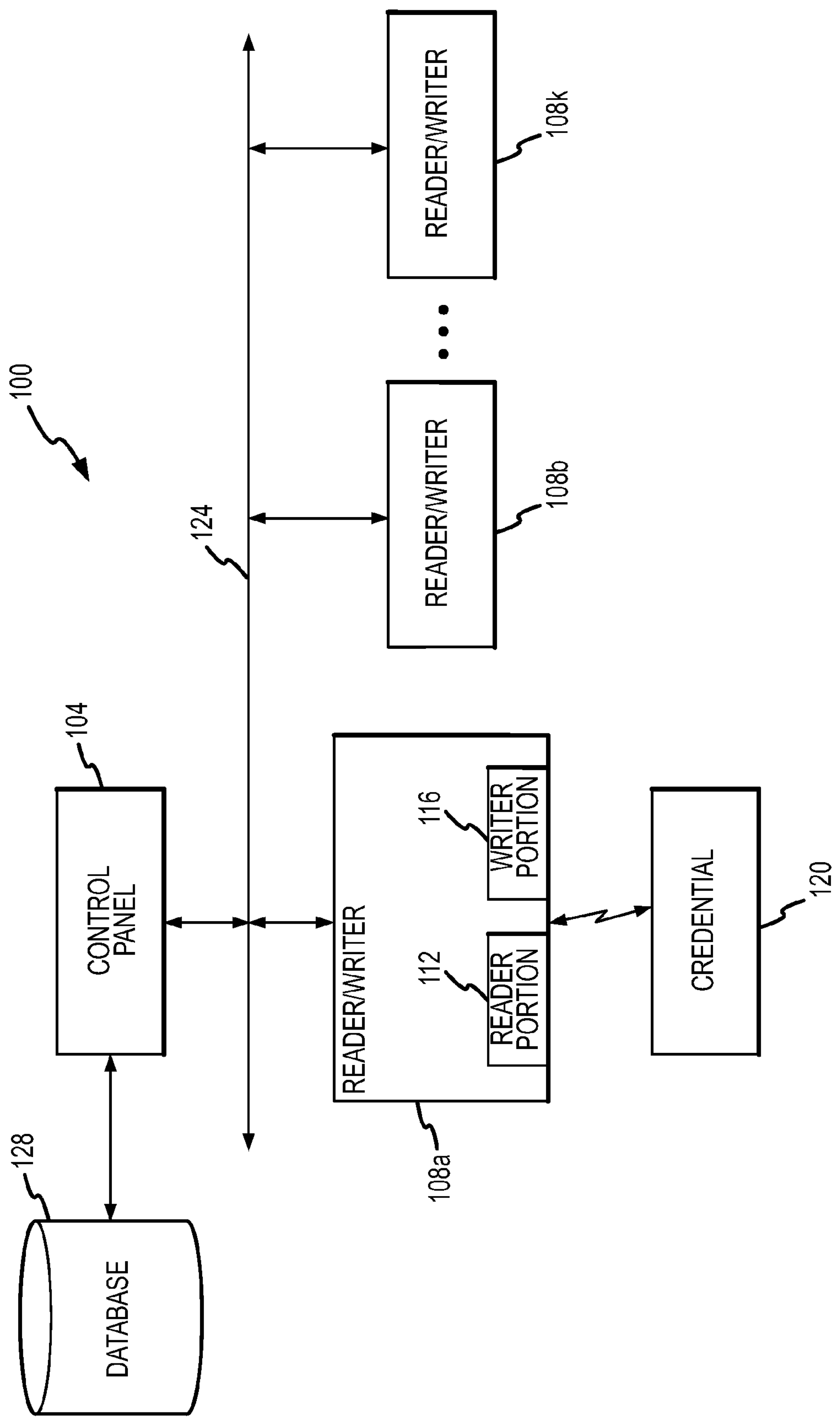
FIG. 1 is a block diagram depicting an exemplary secure access system in accordance with embodiments of the present invention.

FIG. 1 depicts an access network 100 used to verify the identity of at least one credential, usually an RFID credential. In one embodiment of the present invention, the system 100 comprises a control panel 104, a plurality of reader/writers 108*a*-K, where K is an integer and is typically greater than or equal to one, and one or more credentials 120. The plurality of reader/writers 108*a*-K may include reader/writers 108 of the same type, as well as reader/writers of different types. For example, a subset of the plurality of reader/writers 108*a*-K may be RF enabled and are capable of communicating with credentials 120. Whereas another subset of the plurality of reader/writers 108*a*-K may employ other machine reading/writing non-RF machine reading modalities such as magnets, lights, infrared, and so on.

One or more of the reader/writers 108 may further include separate reader portions 112 and writer portions 116. The reader portion 112 is responsible for reading data from credentials while the writer portion 116 is responsible for writing data to credentials. As can be appreciated by one of skill in the art, the reader portion 112 and writer portion 116 may or may not share certain hardware elements. For example, an RF antenna may be shared between the reader portion 112 and the writer portion 116. In accordance with at least some embodiments of the present invention, a common hardware component may implement the functionality of the reader portion 112 and writer portion 116. Such a device would be capable of reading data from and writing data to a particular credential.

One function of a reader/writer 108 is to control access to certain assets. More specifically, a reader/writer 108 may be positioned at an access point for a given asset (e.g., a door for a room, building, or safe, a computer for electronic files, and so on). Unless a proper credential 120 is presented to the reader/writer 108, the access point is maintained in a secure state such that admittance or access to the asset is denied. If a credential 120 having authority to access the asset is presented to the reader/writer 108, then the reader/writer 108 has the discretion to allow the user of the credential 120 access to the asset and implement various actions accordingly.

A second function of some reader/writers 108 in the set of reader/writers 108*a*-K may be to read and rewrite data back to a credential 120 presented to the reader/writer 108. An authorized credential 120 may be presented to such a reader/writer 108 and the reader/writer 108 can read data from the credential 120. Once read, the data may be changed to update access data on the credential 120 or simply to change to another manufacturer's data characteristics. The updated/changed data can then be rewritten back to the same credential 120 thereby creating an updated credential in an efficient manner. In one embodiment, the same reader/writer 108 that read the credential 120 is used to rewrite the data back to the same credential 120. In another embodiment, one reader/writer 108 may be used to read data from the credential 120 and a second different reader/writer 108 may be used to rewrite the changed data back to the credential 120. In the event that different reader/writers 108 are used to read data from and subsequently write data to a credential 120, the data may be passed from the reading reader/writer 108 to the writing reader/writer 108 via a communication network 124.

In the depicted embodiment, the reader/writers 108 are coupled to the control panel 104 through the communication network 124. The communication network 124 connecting the reader/writers 108 to each other and to the control panel 104 may be arranged in any known type of configuration including, without limitation, bus, daisy chain, star, and point-to-point. In some embodiments, the reader/writers 108 may be connected to the control panel 104 through a hub. In an alternate embodiment, the reader/writers 108 may be directly coupled to the respective inputs/outputs of the control panel 104. The communication network 124 between the reader/writers 108 and the control panel 104 generally provides bi-directional communication interfaces, which may selectively be implemented in a form of wired, wireless, fiber-optic communication links, or combinations thereof. Even though the communication network 124 is depicted as a number of bi-directional interfaces, one skilled in the art can appreciate that the communication network 124 may be implemented with unidirectional interfaces that use a unidirectional communication protocol, for example, the Wiegand protocol.

The communication network 124 may be implemented utilizing buses or other types of device connections. The protocols used to communicate between the control panel 104 and the reader/writers 108 and between the reader/writers 108 themselves may include one or more of the TCP/IP protocol, RS 232, RS 485, Current Loop, Power of Ethernet (POE), Bluetooth, Zigbee, GSM, WiFi, and other communication methods and protocols known in the art.

The control panel 104 may be a general-purpose computer adapted for multi-task data processing and suitable for use in a commercial setting. Alternatively, the control panel 104 may be implemented with a host computer and reader/writers 108 can be connected to the host computer via a TCP/IP connection or other type of network connection. A memory comprising a database 128 of records for the system 100 is associated with the control panel 104. The database 128 may be integral with or separated from the control panel 104 as depicted in FIG. 1. The database 128 maintains records associated with the reader/writers 108, credentials 120 and their respective holders or users, algorithm(s) for acquiring, decoding, verifying, and modifying data contained in the reader/writers 108, algorithm(s) for testing authenticity and validity of the credentials 120, algorithm(s) for implementing actions based on the results of these tests, and other needed software programs. Specific configurations of the control panel 104 are determined based on and compliant with computing and interfacing capabilities of the reader/writers 108.

The credential 120 is a device that carries evidence of authority, status, rights, and/or entitlement to privileges for a holder of the credential 120. A credential 120 is a portable device that is used to complete transactions with a reader/writer 108. One example of a credential 120 is an RFID smartcard that has data stored thereon allowing a holder of the credential 120 to access an asset protected by a reader/writer 108. Other examples of a credential 120 include, but are not limited to, proximity cards, access control cards, credit cards, debit cards, passports, identification cards, key fobs, cellular phones, PDAs, tags, or any other device configurable to include a transponder.

As used herein, the terms a "holder" and a "user" are used interchangeably in reference to an individual or an object associated with credential 120.

Figure 2:
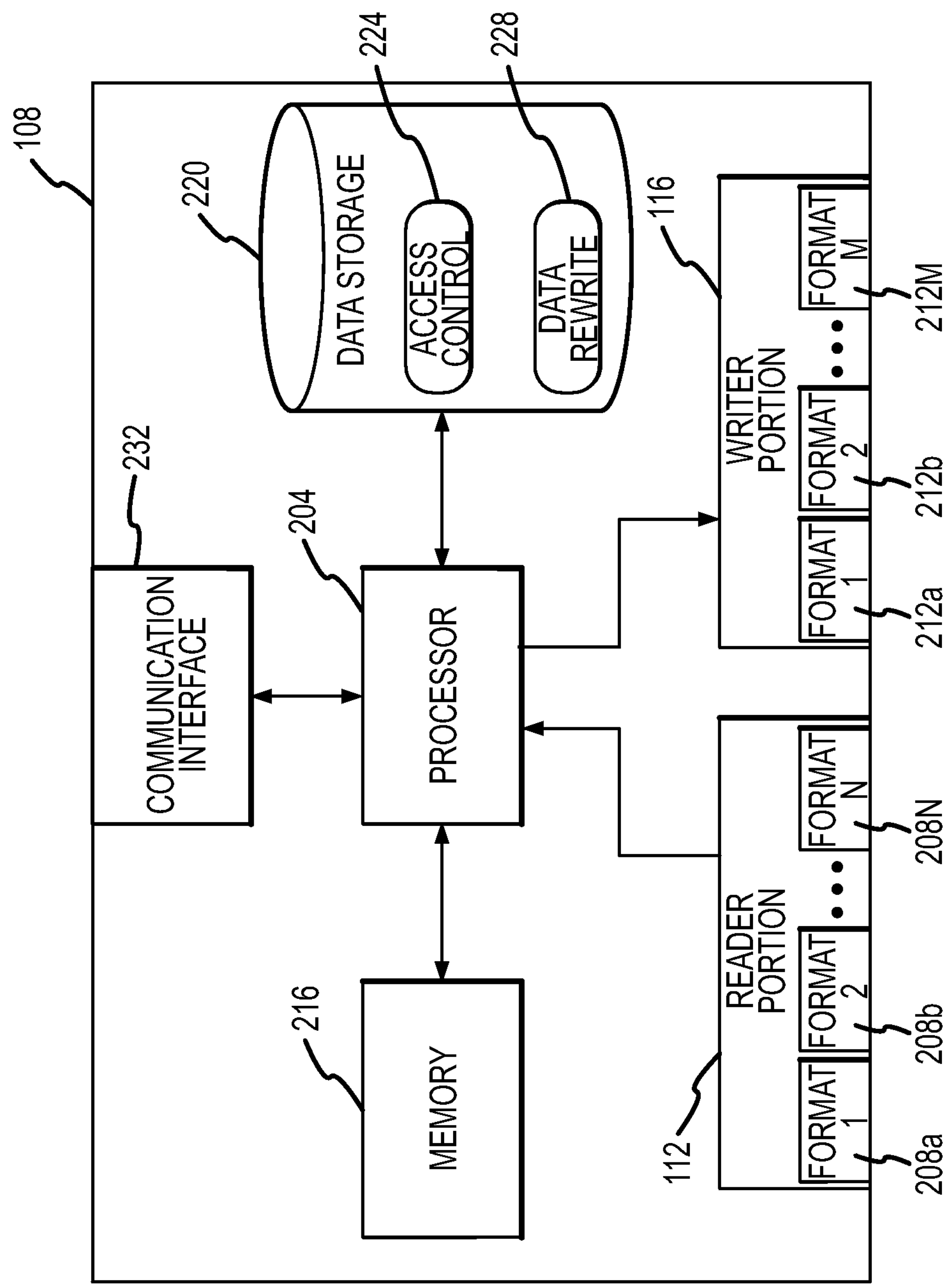
FIG. 2 is a block diagram depicting a reader/writer in accordance with embodiments of the present invention.

Referring now to FIG. 2, an exemplary reader/writer 108 will be described in accordance with embodiments of the present invention. The reader/writer 108 generally comprises a processor 204, a reader portion 112 having a plurality of format modules 208*a*-N, a writer portion 116 having a plurality of format modules 212*a*-M, a memory 216, a data storage 220, and a communication interface 232 to communicate with the control panel 104 via communication network 124 and other external devices such as locks, door stripes, door monitor sensors, egress push buttons, asset access sensors and other reader/writers 108.

As noted above, a reader/writer 108 is typically associated with a particular asset (e.g., a door protecting access to a secure room, a computer lock protecting sensitive information or computer files, a lock on a safe, a bank account, a credit card, and the like). In one embodiment, upon verification of credential information stored on the credential 120, the reader/writer 108 generates signals facilitating execution of the results of interrogating the credential 120 (e.g., engages/disengages a locking mechanism, allows/disallows movement of a monitored article, temporarily disables itself, activates an alarm system, provides access to a computer system, provides access to a particular document, authorize a purchase/withdrawal, and the like). If the credential information is not verified by the reader/writer 108 or is determined to be fraudulent, nothing may happen, the credential 120 may be rejected, and/or alarms may be triggered alerting security personnel. Alternatively, the control panel 104 may generate such signals.

The processor 204 may include any general-purpose programmable processor, digital signal processor (DSP) or controller for executing application programming. Alternatively, the processor 204 may comprise a specially configured application specific integrated circuit (ASIC). The processor 204 generally functions to run programming code implementing various functions performed by the reader/writer 108. The processor 204 receives data read from the reader portion 112 and provides data to the writer portion 116 for writing to a credential 120. The processor 204 is capable of altering or otherwise changing data that is read from the credential 120 and then can provide the changed data to the writer portion or to a different writer portion 116 of a different reader/writer 108*a*-N for subsequent writing back to the credential 120.

The memory 216 generally comprises software routines facilitating, in operation, pre-determined functionality of the reader/writer 108. The memory 216 may be implemented using various types of electronic memory generally including at least one array of non-volatile memory cells (e.g., Erasable Programmable Read Only Memory (EPROM) cells or FLASH memory cells, etc.) The memory 216 may also include at least one array of dynamic random access memory (DRAM) cells. The content of the DRAM cells may be pre-programmed and write-protected thereafter, whereas other portions of the memory may selectively be modified or erased. The memory 216 is generally a temporary data storage location. More specifically, when data is provided from the reader portion 112 to the processor 204, the processor 204 may use the memory 216 to temporarily store a copy of the data while it changes the original data. The changed data may then be compared to the copy of the original data to ensure the accuracy of the changed data. Once the accuracy is confirmed, then the copy of the original data may be removed from memory 216.

The data storage 220 of the reader/writer 108 is a long-term memory as compared to the temporary memory 216. The data storage 220 may comprise, for example, a magnetic storage device, a solid-state storage device, an optical storage device, a logic circuit, or any combination of such devices. It should further be appreciated that the programs and data that may be maintained in the data storage 220 can comprise software, firmware or hardware logic, depending on the particular implementation of the data storage 220.

One application that may be stored in the data storage 220 includes an access control application 224 that limits access to the asset associated with the reader/writer 108. The access control application 224 may include credential 120 authentication algorithms that help the processor 204 determine what credentials are allowed access to the asset. Likewise, a list of allowed credentials may be stored as a part of the access control application 224. In some embodiments, the reader/writer 108 does not perform authentication validation but rather provides data from the credential to the control panel 104 for verification of authenticity. When the control panel 104 determines that the credential 120 is allowed to access the asset protected by the reader/writer 108, the control panel 104 may send a signal to the reader/writer 108 that prompts the reader/writer 108 to allow access to the asset. In other embodiments, the reader/writer 108 may be a stand-alone reader/writer and all of the verifications of authenticity are performed at the reader/writer 108 instead of relying upon a control panel 104. In such circumstances the reader/writer 108 may not even include a communication interface 232.

Another application that may reside in data storage 220 is a data rewrite application 228. The data rewrite application 228 provides the processor 204 with instructions for updating or changing data from a credential 120. The data rewrite application 228 may include data characteristic updates as well as access permissions updates. Characteristic updates may cause data to be changed from any number of data characteristics to a particular manufacturer's set of data characteristics. Access permission updates may actually change the content of the data rather than the characteristics of the data.

In one embodiment of the present invention, a reader/writer 108 creates an RF field using one of the format modules 208*a*-N. A format module 208 generally includes an antenna or other type of interface for machine reading a credential 120 and a demodulation unit. Several format modules 208*a*-N may share a single antenna and/or demodulation unit depending upon the characteristics of data they are designed to read. A signal received at one of the format modules 208 is demodulated and forwarded to the processor 204 for authentication verification and/or data changes.

The format modules 212*a*-M of the writer portion 116 utilize a modulation unit and an antenna. The hardware of the modulation unit and/or antenna may be shared among various format modules 212 of the writer portion 116. Additionally, the format modules 212 of the writer portion 116 may share antennas with format modules 208 of the reader portion 112. If data is to be rewritten back to the credential 120, then the processor 204 determines the characteristics of the data to be rewritten and based on that determination selects a proper format module 212 to which the data should be sent. The processor 204 then sends the data to the selected format module 212 where it is modulated according to the proper characteristics and rewritten back to the credential 120.

A reader/writer 108 may also include one or more communication network interfaces 232. Examples of communication network interfaces 232 include, but are not limited to, a network interface card, a modem, a USB port, a parallel port, a serial port, a Small Computer Systems Interface (SCSI) port, Ethernet, an infrared port, an RF interface, and/or other wired or wireless communication network interfaces.

Figure 3:
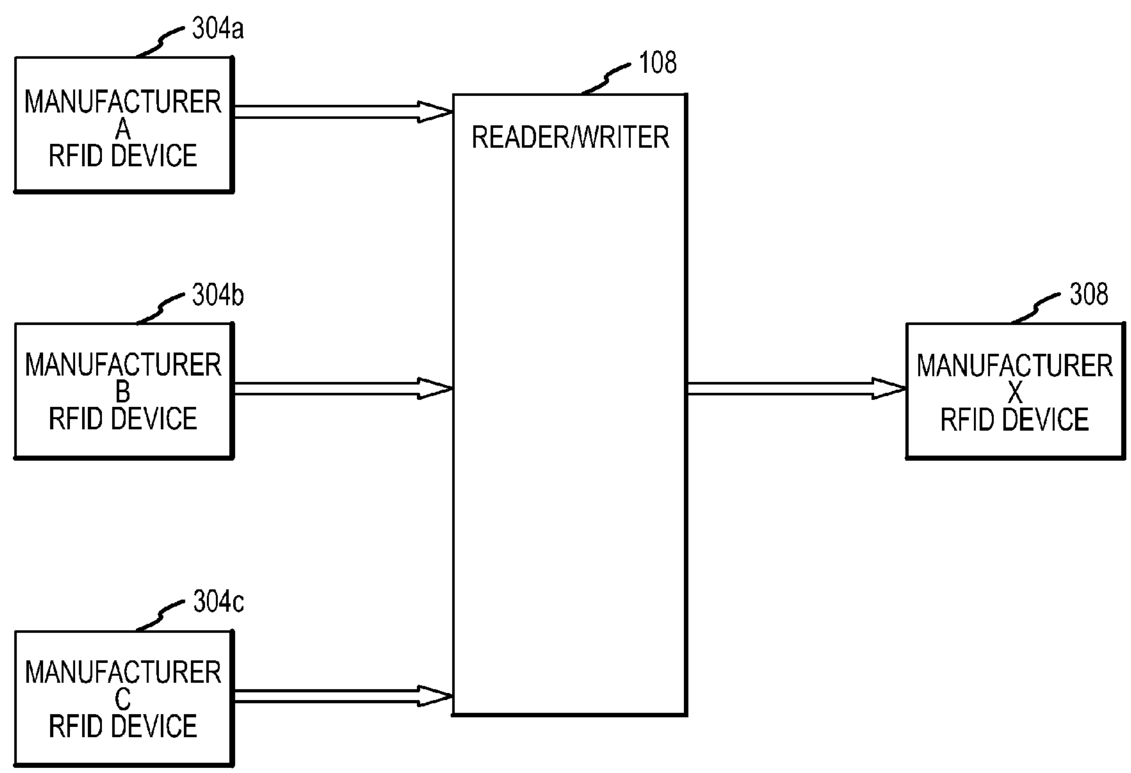
FIG. 3 is a block diagram depicting a reader/writer capable of reading data having different characteristics and rewriting the data to a credential with a different set of characteristics in accordance with embodiments of the present invention.

Referring now to FIG. 3, a reader/writer 108 used to combine data from multiple credentials will be described in accordance with at least some embodiments of the present invention. One example where data from multiple credentials is combined and rewritten to a single credential is when a single user has more than one credential each being responsible for a particular application. In these situations it is beneficial to the user to consolidate the applications onto one credential such that the user does not need to carry multiple credentials.

The reader/writer 108 may be presented with a number of different credentials in sequence. The presented credentials could include two or more credentials from a common manufacturer either having the same communication protocol but different access codes or even having different communication protocols. In another embodiment, the presented credentials could include credentials from different manufacturers. A first RFID credential 304*a* having a first set of characteristics for manufacturer A is first presented to the reader/writer 108. Data from the first RFID credential 304*a* is read by the proper format module 208 and passed to the memory 216 for temporary storage. Thereafter, a second RFID credential 304*b* having a second set of characteristics for manufacturer B is presented to the reader/writer 108. Data from the second RFID credential 304*b* is read by the proper format module 208 and passed to the memory 216 for storage along with the data from the first RFID credential. After the second RFID credential 304*b* has been read, a third RFID credential 304*c* having a third set of characteristics for manufacturer C is presented to the reader/writer 108. Again, the proper format module 208 reads data from the third RFID credential 304*c* and then the data is sent to the memory 216.

Data read from each credential 304 may be stored prior to having their characteristics changed. In this case the processor 204 may change the characteristics of each data in parallel. Alternatively, the processor 204 may change the characteristics of each data in the order it is received. After the data characteristics have been changed to a new set of characteristics (e.g., a set of characteristics corresponding to manufacturer X), the data can either be combined and written to a new RFID credential 308 or the separate data may be written to the new RFID credential 308 one at a time. Characteristics of data may vary between credentials according to a number of different factors known to those of skill in the art. Examples include data format (e.g., the logical arrangement of transmitted data), transmission frequency (e.g., one credential may communicate at 125 kHz and another credential may communicate at 135 kHz), and modulation method (e.g., Amplitude Shift Key (ASK), Frequency Shift Key (FSK), Phase Shift Key (PSK), Manchester, Biphase, Pulse-Code Modulation (PCM), Return-to-Zero (RZ), and Non-Return-to-Zero (NRZ)). Other characteristics that may be changed using embodiments of the present invention include passwords, keys, cryptographic protection algorithms (e.g., DES, AES, etc.), and so on. The characteristics of data generally relate the presentation of data during communications with external devices rather than the content of the data itself.

After writing the data the new RFID credential 308 contains the data or applications stored on each RFID credential 304*a-c* that was read by the reader/writer 108. As can be appreciated, the single reader/writer 108 used to read each RFID credential 304 may employ different format modules 208 to read each RFID credential 304 depending upon the nature of the RFID credential 304. Similarly, the format module 212 of the writer portion 116 used to write data to the RFID credential 308 is chosen based on the data characteristics of manufacturer X.

As one illustrative example, a company such as manufacturer Y that manufactures card and reader products may use a Temic family chip manufactured as an RFID credential 304. The transponder of the RFID credential 304 may be programmed to output data in FSK at 125 kHz and uses a data content structure that is unique to manufacturer Y. Another company, such as manufacturer Z, may also manufacture card and reader products that are very similar to manufacturer Y's products. Manufacturer Z may also use RFID credentials 304 with a Temic chip that also works at 125 kHz but the data content used by manufacturer Z is in a different format. The different format may include the use of a different synchronization mechanism for allowing the reader to determine where the data starts and the ratios of dividers employed. In this particular example, company X may have an access control system with manufacturer Y readers and thousands of manufacturer Y cards in use. At some point company X may decide to switch to manufacturer Z because of the different features offered by manufacturer Z and therefore wishes to switch to an access control system that uses manufacturer Z readers. When company X makes the switch instead of replacing all of the RFID credentials 304, company X can employ the reader/writer 108 to alter the data content from manufacturer Y's format to manufacturer Z's format thereby allowing the RFID credentials 304 to work with the manufacturer Z readers.

Figure 4:
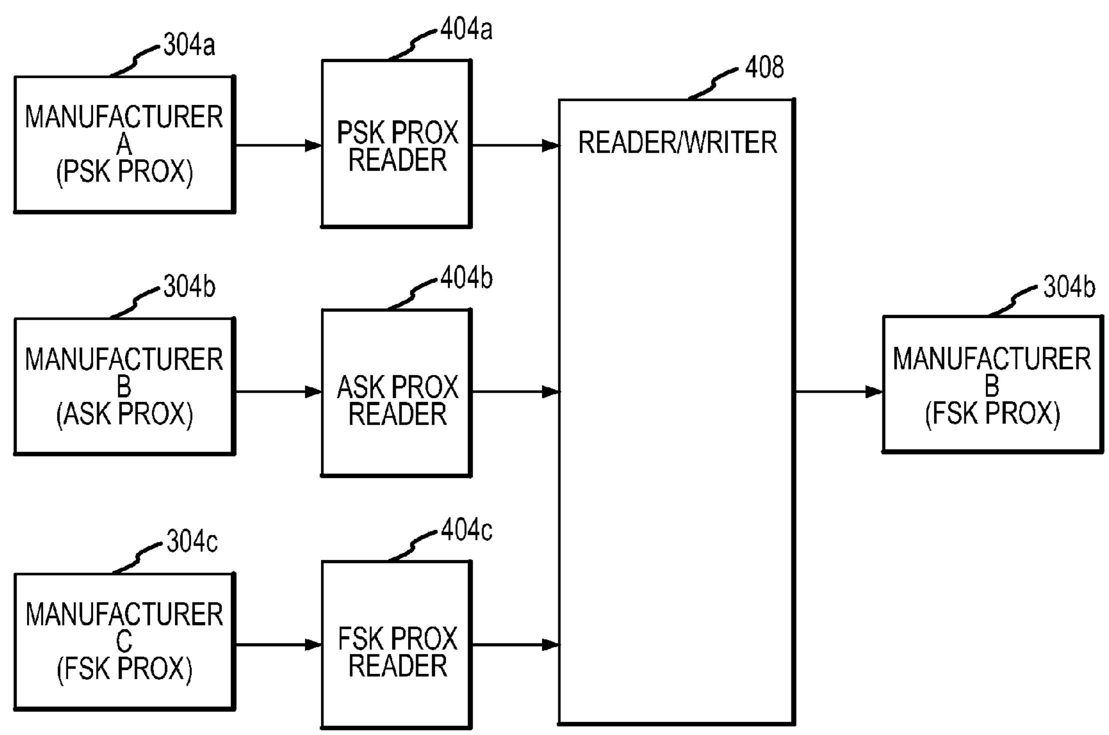
FIG. 4 is a block diagram depicting multiple readers for reading different credentials and a writer for rewriting the data to a credential in a different set of characteristics in accordance with embodiments of the present invention.

FIG. 4 depicts a situation where a number of different RFID credentials are read from different reader/writers 108 and the data from each RFID credential is subsequently written using another different reader/writer 108. The first RFID credential 304*a* may be configured to modulate data communications on a carrier signal using PSK. The first RFID credential 304*a* may be read by a first reader/writer 404*a* capable of reading PSK proximity devices. Data read from the first reader/writer 404*a* may be forwarded to a reader/writer 408 that will be eventually writing the data to back to one of the RFID credentials.

The second RFID credential 304*b* may be configured to modulate data communications on a carrier signal using ASK. The second RFID credential 304*b* may be read by a second reader/writer 404*b* capable of reading ASK proximity devices. Once the second reader/writer 404*b* reads data from the second RFID credential 304*b*, the data may be transmitted to the reader/writer 408 for eventual alteration and writing to an RFID credential.

The third RFID credential 304*c* may be configured to modulate data communications on a carrier signal using FSK. The third RFID credential 304*c* may be read by a third reader/writer 404*c* capable of reading FSK proximity devices. Once the third reader/writer 404*c* reads data from the third RFID credential 304*c*, the data is transmitted to the reader/writer 408.

The reader/writer 408, in one embodiment, is responsible for changing the characteristics of the data from each RFID credential 304 to a common set of characteristics. Once the characteristics of each set of data has been changed resulting in a common set of characteristics among each set of data, the data may be written to one of the RFID credentials from which one set of data originally was read. This way a new RFID credential does not need to be purchased for the updating and combining of data from numerous RFID credentials.

In an alternative embodiment, each reader/writer 404*a-c* may change the characteristics of the data to match the final characteristics prior to sending the data to the reader/writer 408. In this particular embodiment, the function of the reader/writer 408 would be to write the data back to an RFID credential rather than change the data characteristics. In certain embodiments, the reader/writer 408 may be one of the reader/writers 404*a-c* used to read data from the RFID credentials 304*a-c*.

In still a further alternative embodiment, the RFID credentials could also be from three different individuals with each credential having a different format. The data from each card could be rewritten back to the respective card but in a common format. For instance, company X may buy companies A, B, and C and all three sets of new employees can have their RFID credentials migrated to the format of RFID credentials of company X's employees. This way the new employees do not need to be issued new credentials but rather can utilize their credentials from company A, B, or C.

Figure 5:
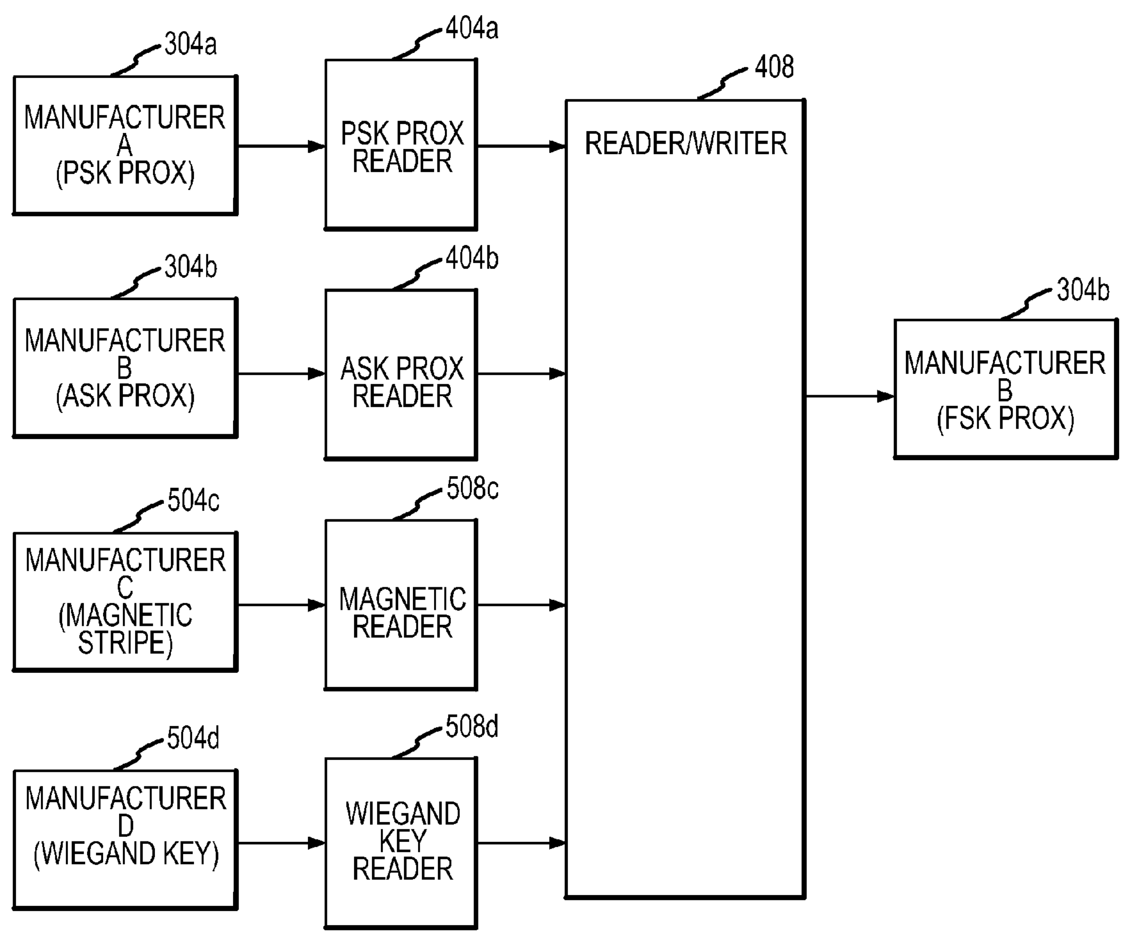
FIG. 5 is a block diagram depicting multiple readers for reading different credential technologies and a writer capable of rewriting the data to a different credential in a similar set of characteristics in accordance with embodiments of the present invention.

With reference now to FIG. 5, an alternative configuration of reader/writers used to update data characteristics will be described in accordance with at least some embodiments of the present invention. Data having different characteristics can be read from various RFID credentials 304*a* and 304*b* as described above using different reader/writers 404*a* and 404*b*. Data from multiple RFID credentials can be combined and rewritten to a common RFID credential. In addition to combining data from multiple RFID credentials, additional reader/writers 508*a* and 508*b* can be used to read other types of machine-readable credentials. For example, a first non-RF credential 504*c* may include data having certain characteristics that allow it to be read by the magnetic reader/writer 508*c*. Once data is read from the magnetic reader/writer 508*c* it is transmitted to the reader/writer 408. The reader/writer 408 may then change the characteristics of the data from the first non-RF credential 504*c* to match characteristics of RF transmitted data. Likewise, a second non-RF credential 504*d* may include data having other characteristics that allow it to be read by a Wiegand Key reader/writer 508*d*. This data is also sent to the reader/writer 408 for eventual alteration and writing to a credential.

As can be appreciated by one skilled in the art, the data does not necessarily need to be rewritten to an RFID credential. According to some embodiments, data from various credentials can be altered such that it can be rewritten to a non-RF enabled credential such as a magnetic card, a barcode, a Wiegand Key, NFC phone, and so on. The number of credentials that have their data combined onto a single credential is only limited to the space for data on the credential that will ultimately receive all of the data. The source of the data does not matter and in many cases will not determine the type of credential the data is to be written to.

Figure 6:
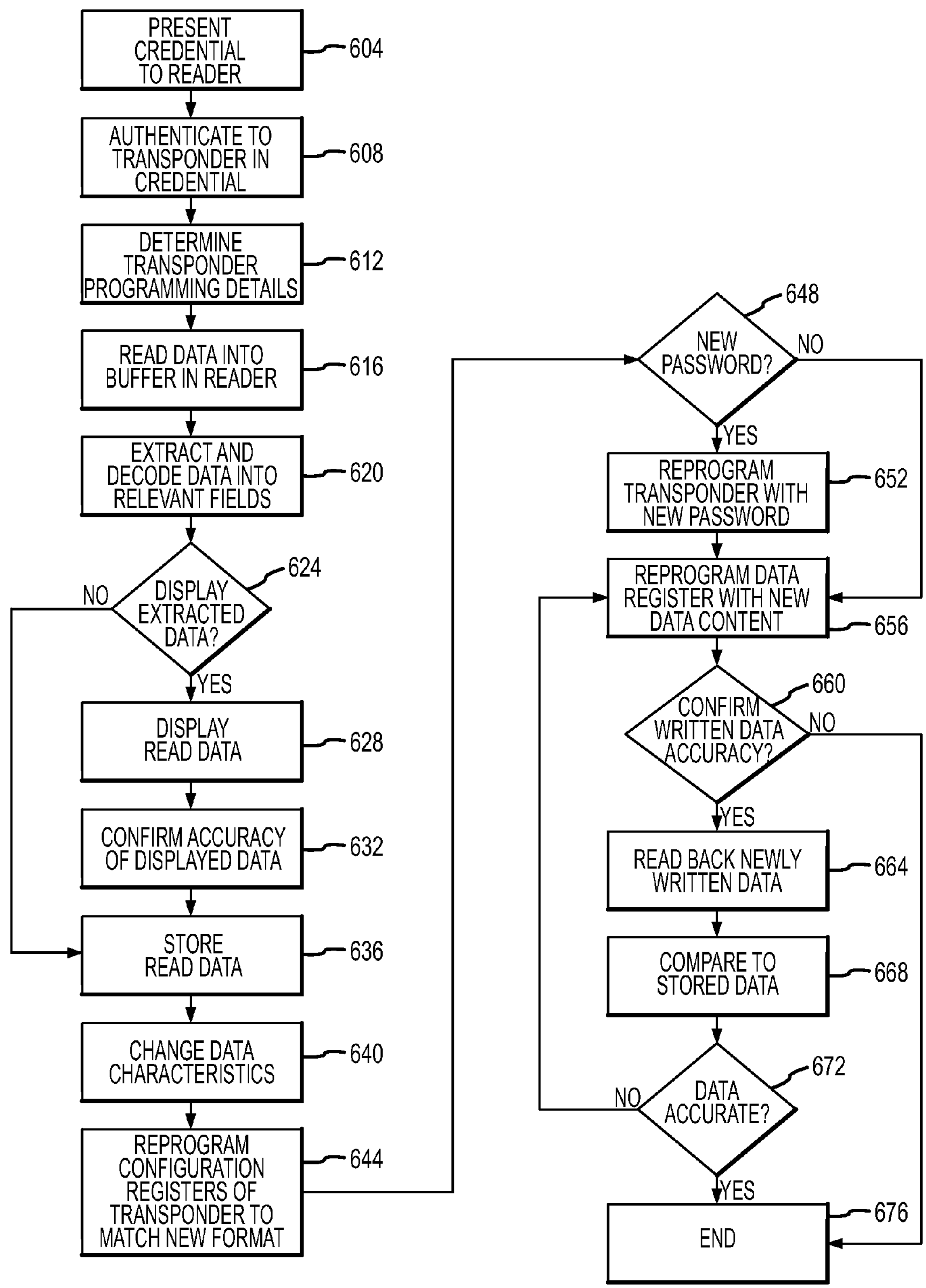
FIG. 6 is a flow diagram depicting a method of treating read data for subsequent writing to the same credential in accordance with embodiments of the present invention.

Referring now to FIG. 6, a method of updating characteristics of data from a credential and writing the updated data back to the same credential will be described in accordance with at least some embodiments of the present invention. Initially, the method begins when a credential 120 is presented to a reader/writer 108 (step 604). After the credential 120 has been presented to the reader/writer 108, the reader/writer 108 authenticates itself to the credential if such authentication is required (step 608). If no authentication is required then authentication is assumed valid. Otherwise, the reader/writer 108 transmits a password or similar authentication detail to the credential 120. The authentication detail may have been provided to the reader/writer 108 upon installation. In an alternative embodiment, the reader could have a "hacking mode" where the authentication details are dynamically determined based on a schedule for example. The credential 120 can check the authentication details to determine if the reader/writer 108 is allowed access to data on the credential 120.

Assuming the reader/writer 108 is allowed access to data stored on the credential 120, the characteristics of the data on the transponder of the credential 120 (in the case of an RF enabled credential) are determined after the credential 120 authenticates the reader/writer 108 (step 612). The characteristics of the data determined by the reader/writer 108 may include the carrier frequency, modulation type, data format, and divide-by-values used to communicate with other credentials among others. These characteristics may be known by the reader/writer 108 prior to reading the credential 120 (e.g., the characteristics of each credential 120 may be stored in the data storage 220 or another local memory location). In this particular case, the reader/writer 108 only needs to search the database for a matching entry for the current credential 120. In an alternative embodiment, the reader/writer 108 may try to dynamically determine what characteristics are used by the credential 120 to communicate with other credentials by sequentially trying each format module 208 until the data is successfully read from the presented credential 120.

Once the characteristics of the data are known by the reader/writer 108, the total data is read from the presented credential 120 and stored in memory 216 (step 616). With the data stored in the temporary memory 216, relevant fields of the data are extracted and decoded by the processor 204 (step 620). The fields that may be extracted from the data include, but are not limited to, card number, site code, user identity, employee number, passwords, keys, and so on.

Thereafter, it is determined whether the extracted data is to be displayed via a human-readable interface (step 624). If the extracted data is not to be displayed to a user, then the method skips to step 636 where the read data is stored. The extracted data may be stored in the memory 216, the data storage 220, and/or the database 128. In the event that the extracted data is to be displayed, then the extracted data is sent to a human-readable interface such as a display screen, an audio output device, or the like (step 628). A user can then confirm the accuracy of the displayed data with the credential 120 (step 632). The confirmation of accuracy may be as simple as comparing the extracted card number with the card number printed on the credential 120. During this confirmation of accuracy step if it is determined that the data was not accurately read, decoded, and extracted from the credential 120 then the method may need to start over or a different reader/writer 108 may need to be employed to read the data from the credential 120. Once the accuracy of the data is determined the data is stored as note above for historical purposes (step 636).

After the extracted data has been stored, the processor 204 employs the data rewrite application 228 and changes at least one characteristic of the extracted data (step 640). The changing of characteristics of the data may include changing one or more of the data's format, the carrier frequency used to transmit the data, the way the data is modulated on the carrier signal, and so on. With the characteristics of the data changed it may then be necessary to reprogram configuration registers of the transponder chip in the credential 120 to match the new characteristics of the data (step 644). Reprogramming configuration registers of the transponder allows the credential 120 to send/receive the data having the new set of characteristics. For example, if the characteristics of the data changed such that a new modulation scheme were to be employed, the configuration registers of the transponder should be reprogrammed such that the data could be properly modulated/demodulated by the transponder of the credential 120.

With transponder registers properly configured it is then determined if a new password should be used for a reader/writer 108 to authenticate itself to the credential 120 (step 648). If a new password is desired, then the transponder of the credential 120 is reprogrammed with a new password (step 652). The new password is maintained in the data storage 220 of the reader/writer 108 such that it can send the new password to the transponder in future transactions with the credential 120. Additionally, the new password may be sent to the database 128 for long-term storage.

After the password has been changed, or in the event that no change to the password was desired, the changed data having the new set of characteristics is written back to the credential 120 (step 656). In this step the same reader/writer 108 that read the data from the credential 120 may also be used to write the data back to the credential 120. In an alternative embodiment, a different reader/writer 108 may be used to write the data back to the credential 120. Once the data has been written back to the credential 120 it is determined if the accuracy of the written data is to be confirmed (step 660). If the written data is to be assumed accurate with confirmation, then the method ends at step 676. However, if the accuracy of the written data is to be confirmed, then the reader/writer 108 reads back the newly written data from the credential 120 (step 664). Thereafter, the processor 204 compares the newly read data with the historical record of the updated data to ensure that a match has occurred (step 668). Once the written data is compared to the historical record of the updated data it is determined if the written data is accurate (step 672). If the written data is confirmed to be accurate the credential 120 is ready for use with the updated data and the method ends (step 676). If the accuracy of the data was compromised when it was written back to the credential 120 then the method returns to step 656 where another attempt of writing the data to the credential 120 is attempted. If it continues that data written to the credential 120 is inaccurate, then the credential 120 may be discarded or replaced with a new credential 120 to which the updated data is written.

Figure 7:
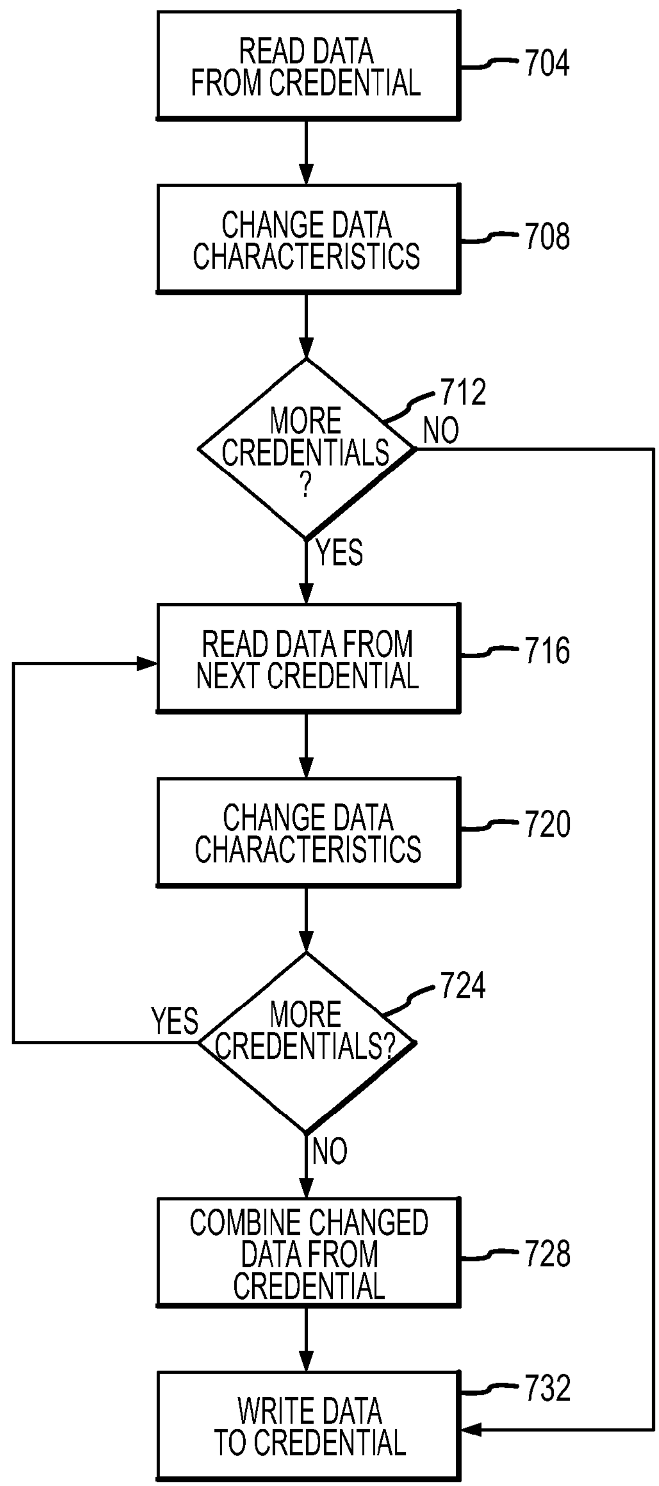
FIG. 7 is a flow diagram depicting a method of updating a number of credentials in accordance with embodiments of the present invention.

Referring now to FIG. 7, a method of combining data from multiple credentials will be described in accordance with at least some embodiments of the present invention. The method begins when data is read from a first credential 120 by a reader/writer 108 (step 704). The characteristics of the data read from the first credential 120 are then changed to an updated set of characteristics (step 708). The updated set of characteristics may be the same as the first set of characteristics in some embodiments, but typically the updated set of characteristics will differ from the first set of characteristics in that at least a portion of the characteristics will have changed (e.g., format, carrier frequency used, modulation method, divide-by-value, etc.). As can be appreciated sometimes a significant difference between the first set of characteristics and the updated set of characteristics may exist. In other embodiments only a small difference may exist. For example, if the carrier frequency is changed but the same credential 120 will ultimately have the data rewritten back to it, then the carrier frequency will not change much. A credential 120 may be designed to use a carrier signal with a frequency that can vary between about 100 kHz and about 150 kHz. The data may have been originally configured to use a carrier signal of about 125 kHz and after changing characteristics of the data a carrier signal of about 110 kHz may be employed. This change does not represent a significant change in carrier frequency considering the breadth of the electromagnetic spectrum, but still constitutes a change to the characteristics of the data.

After the data from the first credential 120 has been properly changed to have the updated set of characteristics it is determined if more credentials 120 will have their data characteristics updated and added to a credential along with the data from the first credential 120 (step 712). In the event that no further credentials 120 are going to be used, the updated data from the first credential 120 is written back to a credential (step 732). In this step, the data may be rewritten back to the first credential 120 or may be written to a new credential 120.

In the event that more credentials 120 are going to have their data added to a credential with the data from the first credential 120, the reader/writer 108 continues to read data from the next credential 120 (step 716). In one embodiment, the data read from the next credential 120 is read by the same reader/writer 108 that read the first credential 120. In other embodiments, a different reader/writer 108 is used to read the next credential 120. Once the data has been read from the next credential 120, the characteristics of the data from the next credential 120 are changed to match the updated set of characteristics (step 720). During this step the changed data from the first credential 120 may be stored in memory 216. The data from the next credential may have originally had a second set of characteristics that differed from the first set of characteristics of the data from the first credential 120. However, it is possible that the characteristics of the data from the next credential 120 match the characteristics of the data from the first credential 120.

After the characteristics of the data from the next credential 120 have been changed to match the updated set of characteristics, the method continues to determine if any more data from other credentials is desired (step 724). If data from further credentials is desired, then the method returns to step 716. Once data from all of the desired credentials 120 has been read and the characteristics of that data have been changed to a common set of characteristics, the data from all of the credentials 120 is combined (step 728). In the combination step, the data from each credential may be collected in the memory 216 and prepared for writing to a credential 120. Thereafter, the combined data is written to a credential 120 (step 732). The data may be written to the credential 120 all at once or in a piecewise fashion depending upon the type of credential 120 being employed and the nature of the data being written. The credential 120 to which the combined data is written may be one of the credentials 120 from which some of the data was read. In an alternative embodiment, the credential 120 to which the combined data is written may be a new credential 120.

Although embodiments of the present invention have been described primarily using examples of 125 kHz RFID credentials, embodiments of the invention are not so limited. Rather, inventive aspects of the present invention may equally be applied to contactless smart cards operating at 13.56 MHz, Near Field Communication (NFC) devices, or even UHF tags used in logistical supply chain applications. In one example, company A may use Mifare (a 13.56 MHz contactless smart card technology owned by Philips Electronics) with a set of keys and data content unique to company A. Company B may also use Mifare but with different keys and different data content. Moving from company A to company B using the same card can also be accomplished employing embodiments of the present invention The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover though the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method of updating an access control system, comprising:

reading data from a first RFID credential that utilizes a first set of characteristics to communicate with RFID readers;

changing at least one characteristic of said data such that at least one characteristic in the first set of characteristics changes, resulting in a second set of characteristics;

writing the data with the second set of characteristics back to the first RFID such that the first RFID utilizes the second set of characteristics to communicate with RFID readers storing the read data into a portion of memory;

extracting the data from the memory into fields, wherein the fields comprise at least one of card number, site code, manufacturer data, and user data;

reformatting the data in each field to match the second set of characteristics; and comparing known data for a field with reformatted data from the corresponding field.

2. The method of claim 1, wherein the first set of characteristics cause the first RFID to utilize a first carrier frequency and the second set of characteristics cause the first RFID to utilize a second carrier frequency, and wherein the first and second carrier frequencies are different.

3. The method of claim 1, wherein the first set of characteristics correspond to a data format used by a first manufacturer and the second set of characteristics correspond to a data format used by a second different manufacturer.

4. The method of claim 1, further comprising reprogramming the first RFID credential with a password upon writing the data to the first RFID credential.

5. The method of claim 1, wherein the at least one changed characteristic comprises one or more of the following: format and data content, frequency, modulation method, passwords, security keys, encryption algorithms, and digital certificates.

6. The method of claim 5, wherein the at least one changed characteristic comprises format and wherein the format of the data changes from a first modulation method to a second different modulation method.

7. The method of claim 6, wherein the first modulation method comprises one of Amplitude Shift Key (ASK), Frequency Shift Key (FSK), Phase Shift Key (PSK), Manchester, Biphase, Pulse-Code Modulation (PCM), Return-to-Zero (RZ), and Non-Return-to-Zero (NRZ) and wherein the second modulation method comprises a different one of ASK, FSK, PSK, Manchester, Biphase, PCM, RZ, and NRZ.

8. The method of claim 1, further comprising:
reading data from a second RFID credential that utilizes a third set of characteristics to communicate with RFID readers;
changing the data from the second RFID credential such that at least one characteristic in the third set of characteristics changes, resulting in the second set of characteristics;
combining the changed data from the second RFID credential with the changed data from the first RFID credential; and
writing the combined data with the second set of characteristics back to the first RFID.

9. The method of claim 8, wherein the first and third set of characteristics have at least one characteristic that differs between them.

10. The method of claim 1, further comprising:
reading data from a second credential that utilizes a third set of characteristics to communicate with credential readers;
changing the data from the second credential such that at least one characteristic in the third set of characteristics changes, resulting in the second set of characteristics; and
writing the changed data from the second credential to the first RFID credential.

11. The method of claim 10, wherein the second credential comprises an RFID credential.

12. The method of claim 10, wherein the second credential comprises a non-RF enabled machine-readable credential.

13. A system for updating one or more RFID credentials, comprising:
at least one reader capable of utilizing a first set of characteristics to read data from a first RFID credential;
a processor for changing characteristics of the read data such that at least one characteristic in the first set of characteristics changes, resulting in a second set of characteristics; and
at least one writer capable of utilizing a second set of characteristics to write the changed data with the second set of characteristics back to the first RFID such that the first RFID utilizes the second set of characteristics to communicate with RFID readers;
wherein the at least one reader comprises a reader capable of reading a non-RF based credential and wherein the at least one writer comprises a writer capable writing data with changed characteristics back to the non-RF based credential.

14. The system of claim 13, wherein the at least one reader and writer are associated with different housings.

15. The system of claim 13, wherein the at least one reader and writer communicate with each other using at least one of serial asynchronous communications, I2C, SPI, Wiegand, clock and data, Bluetooth, ZigBee, infrared light, visible light, and magnetic communication methods.

16. The system of claim 13, wherein the at least one reader and writer are connected in one of a bus, daisy chain, star, and point-to-point configuration.

17. The system of claim 13, wherein the at least one changed characteristic comprises one or more of the following: format, frequency, and modulation method.

18. The system of claim 17, wherein the at least one changed characteristic comprises format and wherein the format of the data changes from a first modulation method to a second different modulation method.

19. The system of claim 18, wherein the first modulation method comprises one of Amplitude Shift Key (ASK), Frequency Shift Key (FSK), Phase Shift Key (PSK), Manchester, Biphase, Pulse-Code Modulation (PCM), Return-to-Zero (RZ), and Non-Return-to-Zero (NRZ) and wherein the second modulation method comprises a different one of ASK, FSK, PSK, Manchester, Biphase, PCM, RZ, and NRZ.

* * * * *